United States Patent [19]

Nakamura et al.

[11] Patent Number: 5,751,402
[45] Date of Patent: May 12, 1998

[54] MICROFILM CASSETTE AND MICROFILM CAMERA

[75] Inventors: Kiyoji Nakamura; Hiroyuki Okabayashi; Mutsumi Ashizawa, all of Kanagawa, Japan; Shinichi Shidara; Hajime Tachibana, both of Tokyo, Japan

[73] Assignee: Fuji Photo Film Co., Ltd., Kanagawa, Japan

[21] Appl. No.: 679,630

[22] Filed: Jul. 10, 1996

[30] Foreign Application Priority Data

Jul. 10, 1995 [JP] Japan ................... 7-195726

[51] Int. Cl.$^6$ .................... G03B 27/58; G03B 27/62; G03B 23/02
[52] U.S. Cl. .................... 355/40; 355/47; 352/78 R; 396/511; 396/512
[58] Field of Search ................... 352/78 C, 76, 352/78 R, 255; 355/40, 47; 396/511, 207, 512, 513; 242/347.1, 341, 335, 338, 338.2

[56] References Cited

U.S. PATENT DOCUMENTS

| | | | |
|---|---|---|---|
| 3,779,484 | 12/1973 | Porazinski | 352/78 X |
| 4,007,889 | 2/1977 | Langford | 352/78 C X |
| 4,581,729 | 4/1986 | Beaujean | 352/78 R X |
| 4,928,900 | 5/1990 | Beery | 352/78 C X |

*Primary Examiner*—Arthur T. Grimley
*Assistant Examiner*—Shival Virmani
*Attorney, Agent, or Firm*—Sughrue, Mion, Zinn, Macpeak & Seas, PLLC

[57] ABSTRACT

There is provided a microfilm cassette capable of reducing the case size and obtaining a rational arrangement of elements such as reels and photographic roller. The microfilm cassette includes: a case having a substantially rectangular shape as viewed from the top; a supply reel and a take-up reel mounted inside the case and arranged adjacent to each other horizontally in the length side direction of the case; a photographic opening located around the center of one short side of the case; a photographic roller arranged in a position opposite to the photographic opening; and a shutter for opening and closing the photographic opening. The short side of the cassette case on which the photographic opening is located may be bulged and expanded outwardly around the center of the photographic opening, so that the mark taking lens and the image taking lens can be arranged close to each other. Further, a pair of labels may be attached to the case in positions substantially symmetric with respect to the central axis parallel to the long side of the case. The microfilm camera for this microfilm cassette is also provided.

6 Claims, 10 Drawing Sheets

SCANNER TYPE

SCANNER AND MICROFILM CAMERA

MULTI-SORTER

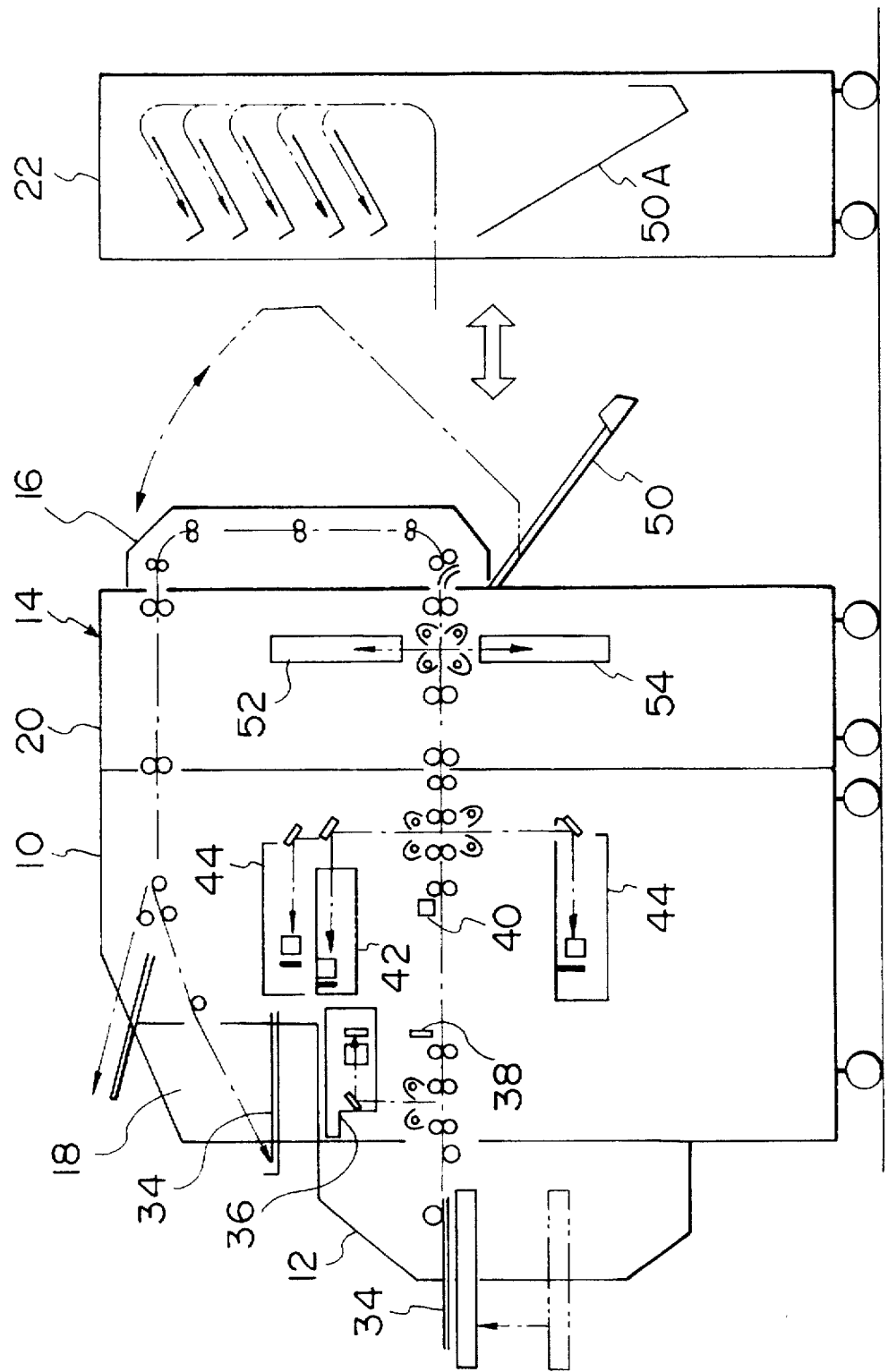

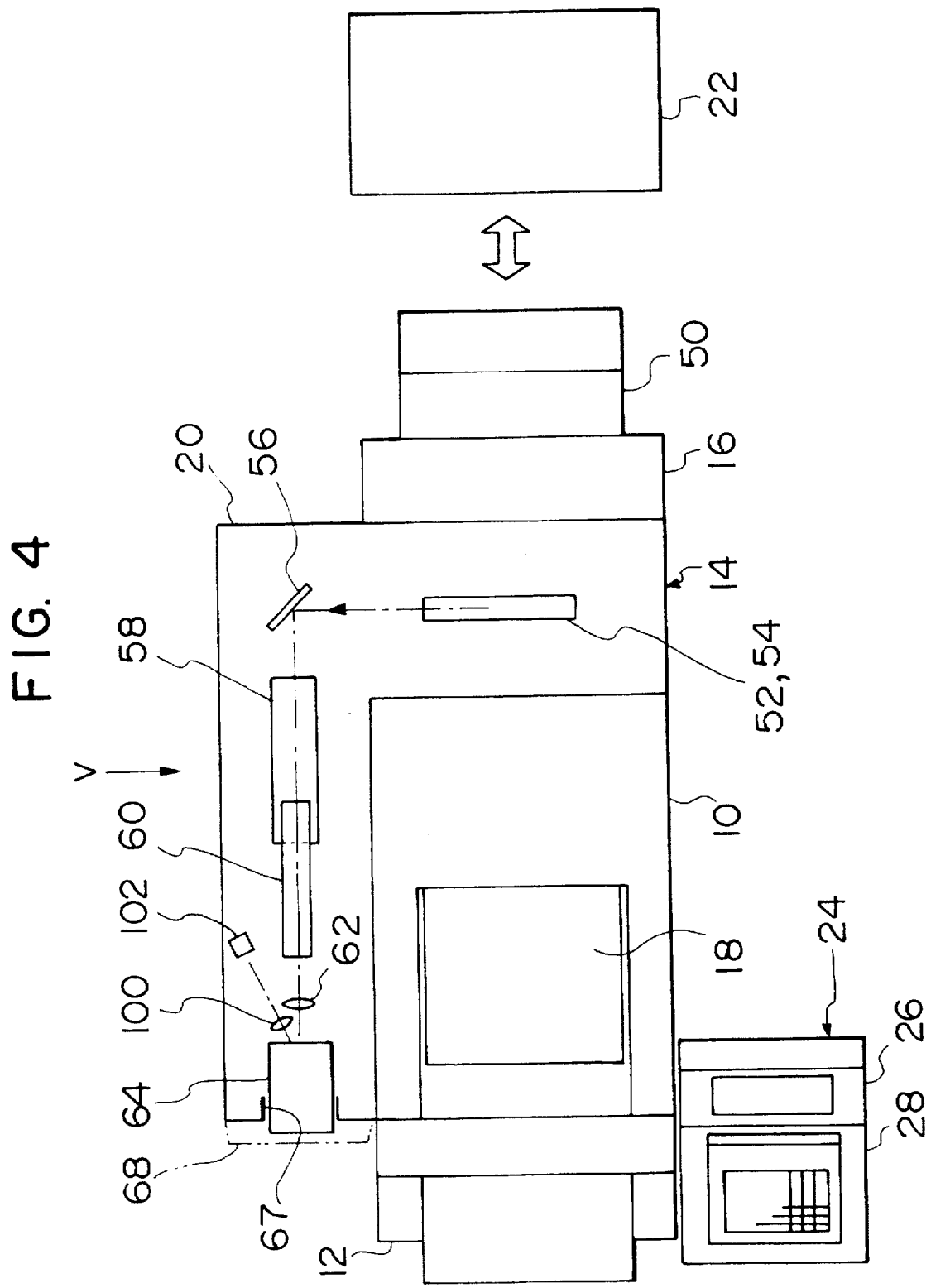

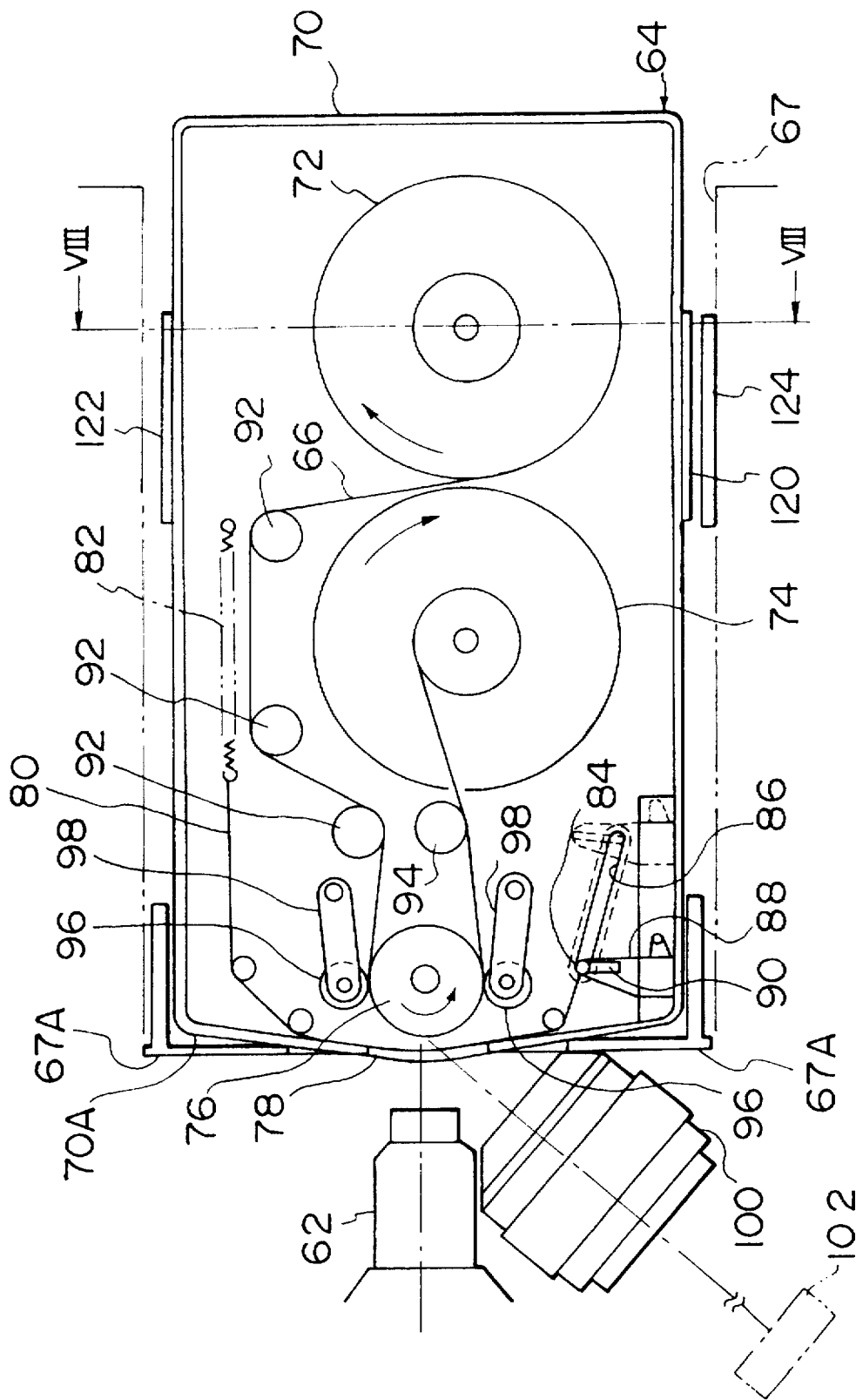

MICROFILM CASSETTE AND MICROFILM CAMERA

BACKGROUND OF THE INVENTION

1. Field of the Invention

The present invention relates to a microfilm cassette with a roll film mounted therein for photographing images of documents on the roll film by a slit exposure system. The present invention also relates to a microfilm camera using the microfilm cassette.

2. Prior Art Statement

There is known in the art a microfilm camera using a cassette with a roll film mounted therein for photographing images of documents on the roll film by a slit exposure system.

Such a cassette includes a supply reel and a take-up reel on which the roll film was wound up from both ends of the roll film, and a photographic roller around which the roll film was wrapped so that a portion of the roll film wound or wrapped around the photographic roller can face a photographic opening at inner part of the cassette, the photographic opening provided on one side of the cassette. Thus, an image of a document is photographed on the roll film through the photographic opening.

FIG. 11 is a plan view showing a structure of a conventional microfilm cassette 200. In FIG. 11, there are shown a rectangular case 202, a supply reel 204, a take-up reel 206 and a photographic roller 208. The supply reel 204 and the take-up reel 206 reel wind up both ends of a roll film 210, respectively. The roll film 210 is then guided by guide rollers 212, 212 and wrapped around the photographic roller 208. The photographic roller 208 is held between a pair of nip rollers 214, 214 to secure adherence of the roll film 210 to the round surface of the photographic roller 208. In the case 202, a photographic opening 216 is also provided on one side thereof.

When loading the cassette 200 into a microfilm camera, the photographic opening 216 has the front toward a photographic lens or image taking lens 218, and images of documents are photographed on the roll film 210 by a slit exposure system through the opening 216.

With such a structure of the conventional cassette 200, the both reels 204, 206 need to be arranged with a space almost equal to the diameter of the photographic roller 208, and the photographic roller 208 tends to remarkably project toward the photographic lens 218 from the both reels 204, 206, therefore, a problem arises that the cassette increases in size. Since the nip rollers 214 are attached to and held at respective swing ends of swinging levers 220, the projecting amount of the photographic roller 208 to project toward the photographic lens 218 become significantly large depending on the length of the lever 220.

Further, a retrieval mark such as a blip mark or a title may be recorded nearby the frame in which the image is photographed or superimposed on the roll film at the same time when taking a photograph of the image of a document. The present applicant has considered the provision of a microfilm cassette and a microfilm camera using the cassette, in which a mark taking lens (mark photographing lens) is put in a position close to the image taking lens (photographic lens), with the optical axis of the mark taking lens inclined or tilted in the length side or longitudinal direction of the film with respect to the optical axis of the image taking lens so that both the optical axes can intersect substantially at the same point on the film surface. In this case, since the optical axis of the mark taking lens is tilted to the length side of the case 202, another problem arises that the photographic opening becomes large.

A duo-photographing method (reciprocal photographing method) is often used for photographing images of documents on a microfilm, in which the microfilm is divided into upper and lower two channels in the width side direction, and, after continuously photographing images of documents on one channel side, images of the remaining documents are continuously photographed on the other channel side in the reverse direction. In this photographing method, the user is required to change the film to be loaded in the camera or to turn the cassette the upside down. The user also need to know photographic data such as film sensitivity and film thickness before taking a photograph of an image of a document. It is therefore desired to securely detect the front or back side of a cassette side currently loaded and to obtain photographic conditions such as film sensitivity and film thickness with a simplified system structure.

SUMMARY OF THE INVENTION

The present invention has been accomplished under the circumstances as aforementioned, and an object thereof is to provide a microfilm cassette capable of reducing the case size and obtaining a rational arrangement of elements such as reels and photographic roller.

Another object of the present invention is to provide a microfilm cassette adapted for a microfilm camera with a mark taking lens for recording or superimposing a mark on a microfilm, the mark taking lens having an optical axis that intersects with that of a photographic lens at a point near the film surface.

Still another object of the present invention is to provide a microfilm cassette capable of easily detecting photographic conditions such as a cassette side currently loaded.

Yet another object of the present invention is to provide a microfilm camera using the microfilm cassette that satisfies the above-mentioned objects.

The objects of the present invention are attained by the provision of a microfilm cassette with a roll film mounted therein for photographing images of document papers on the roll film by a slit exposure system, comprising:

a case having a substantially rectangular shape as viewed from the top;

a supply reel and a take-up reel mounted inside said case and arranged adjacent to each other horizontally in the length side direction of said case, where the roll film is wound round the reels from both ends of the roll film;

a photographic opening formed around the center of one short side of said case;

a photographic roller for being wrapped with the roll film around the outer surface thereof, the photographic roller being arranged in a position opposite to said photographic opening; and a shutter for opening and closing said photographic opening.

The short side of the case on which the photographic opening is provided in a position opposite to the photographic roller is bulged or expanded outwardly around the center of the photographic opening, so that a mark taking lens and an image taking lens can be arranged close to each other, thereby reducing the size of the photographic opening to be provided on the side wall of the case. Further, a pair of labels may be attached to the case in substantially symmetrical positions with respect to the central axis parallel to the length side of the case, so that photographic conditions such as a currently loaded side of the cassette can be checked.

A microfilm camera using such a cassette as mentioned above includes one label detection means provided in a cassette loading port for detecting one of the labels. When the cassette distorted outwardly around the photographic opening is used, the camera may be provided with a mark taking lens having an optical axis inclined or tilted in the length side or longitudinal direction of the film with respect to that of an image taking lens so that both the optical axes can intersect near the film surface. With such construction, an interference between the cassette and the mark taking lens can be effectively prevented, and this makes it possible to reduce the photographic opening in size.

BRIEF DESCRIPTION OF THE DRAWINGS

The above and other objects and advantages and further description will now be discussed in connection with the drawings, in which:

FIG. 3 is a side view showing an inner arrangement of the combined document reader and microfilm camera in FIG. 1;

FIG. 4 is a plan view of the combined document reader and microfilm camera in FIG. 1;

FIG. 7 is a plan view showing an inner arrangement of a microfilm cassette according to the embodiment of the present invention;

DETAILED DESCRIPTION OF THE PREFERRED EMBODIMENTS

Figure 1:
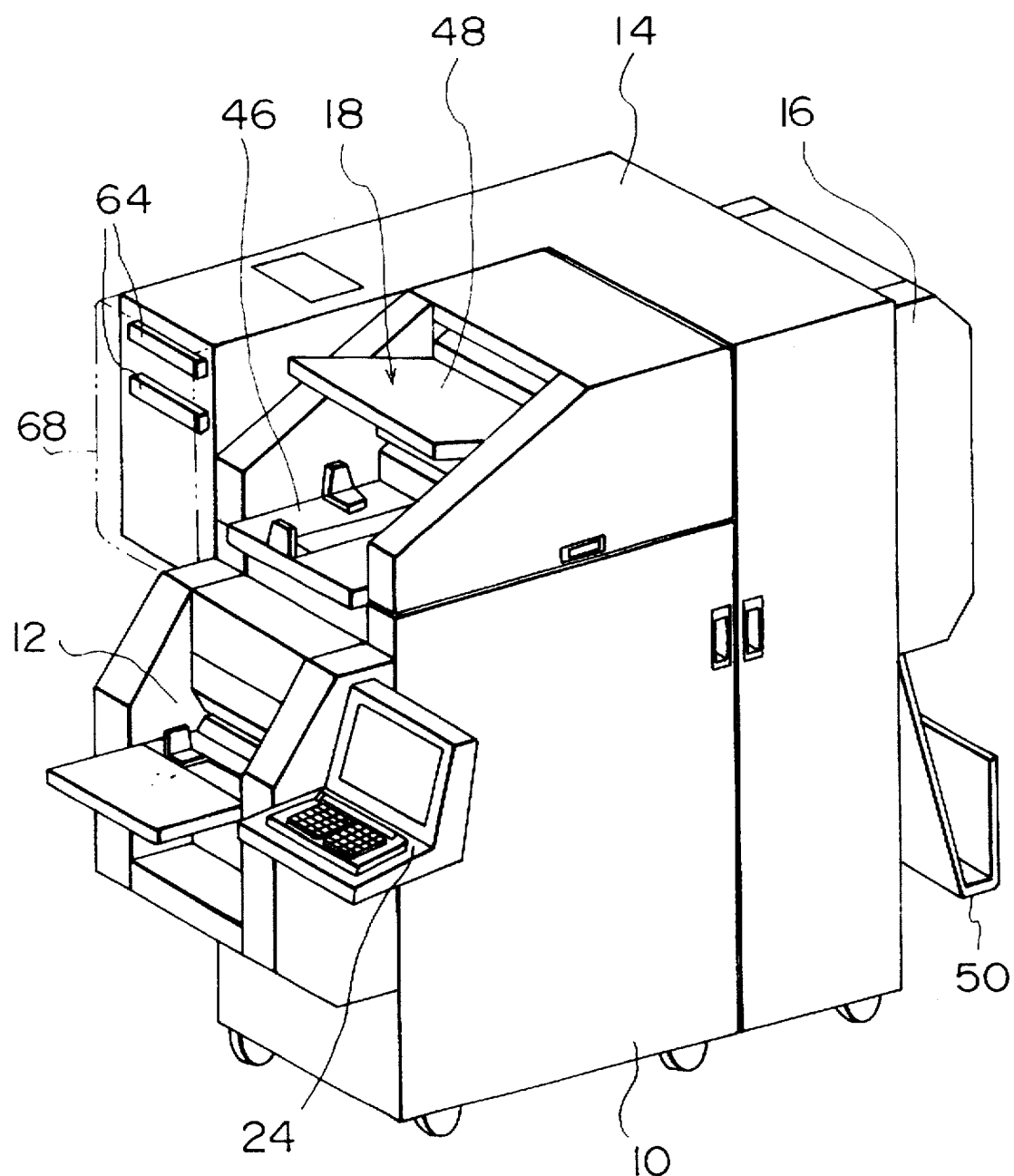
FIG. 1 is a perspective view showing a general structure of combined document reader and microfilm camera to which an embodiment of the present invention is applied.
Figure 2A:
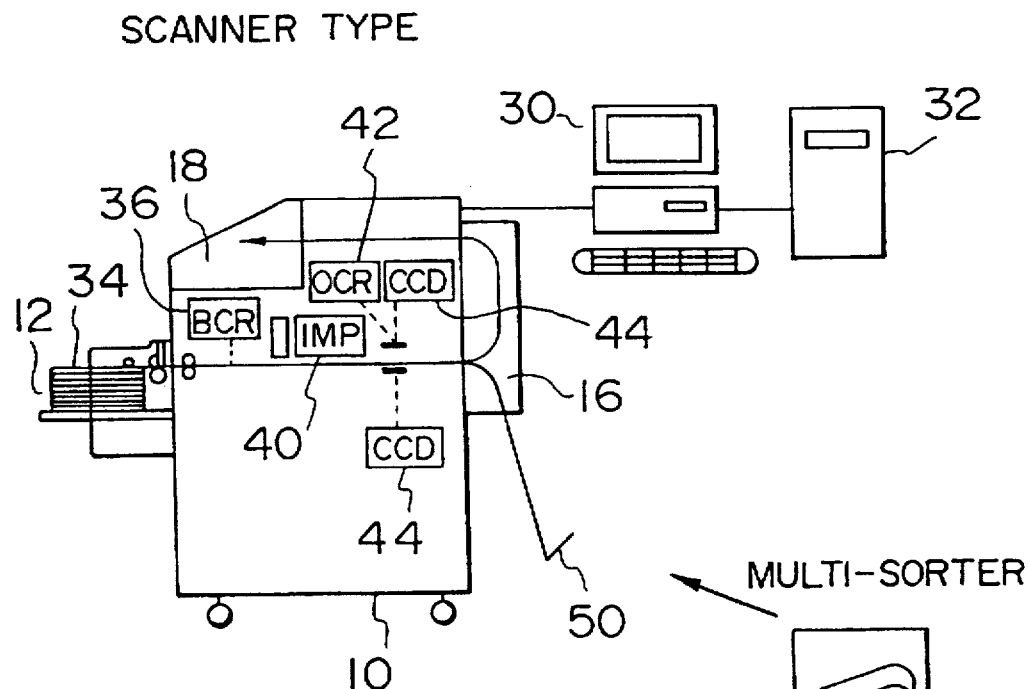
FIG. 2 shows two simplified diagrams explaining how to use the combined document reader and microfilm camera in FIG. 1.
Figure 2B:
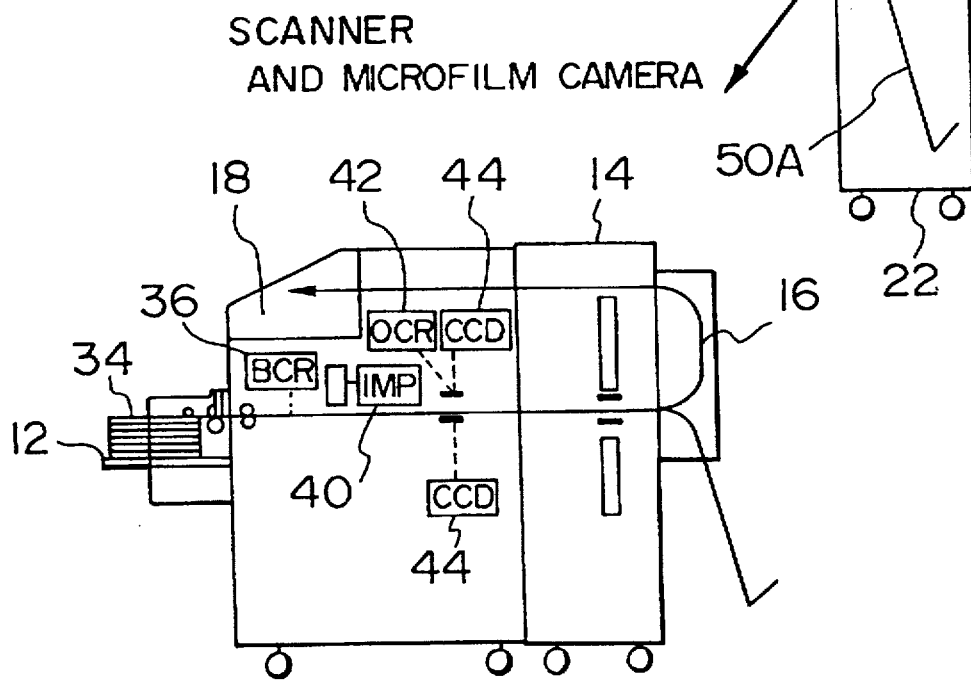

Referring to FIGS. 1 to 4, there are shown a scanner 10 constituting a main body of a document reader, an auto-feeder (automatic document feeder: ADF) 12, a microfilm camera 14, a turn unit 16 and a stacker 18. The auto-feeder 12 is removably attached to the front of the scanner 10. The microfilm camera 14 has an L-shaped cabinet 20 as viewed from the top in FIG. 4 and the cabinet 20 surrounds the back and left sides of the scanner 10. In FIGS. 2 to 4, a reference numeral 22 denotes a multi-sorter which can be used instead of the turn unit 16.

Referring to FIGS. 1 and 4, there is shown a control unit 24 with a display 26 and a keyboard 28. The control unit 24 is used to display a status and to input or set conditions for controlling the whole system. For example, the control unit 24 is used to select and set reading conditions of the scanner 10 and a photographing mode of the microfilm camera 14.

In FIG. 2, a reference numeral 30 denotes a personal computer PC (or a work station WS) in which image data and associated attribute information read by the scanner 10 are input to be subjected to a predetermined image processing or processings, and the processed image data is stored in a memory such as magneto-optic disk 32. The processed image data may be supplied to a printer (not shown) as required, or transferred to other computer or image processor.

The scanner 10 is provided with carrying means for carrying document papers 34 one by one from the auto-feeder 12 horizontally and linearly in a back side direction. Each document paper 34 first passes through a bar-code reader (BCR) 36, and a bar code attached to the document 34 in a predetermined position is read by the bar-code reader 36. The bar code contains some information of the document 34, which is used to identify set conditions of the document 34 based on the format number or the like and to select a reading mode of the document 34 from all modes presetting reading conditions needed for an OCR 42 and an image scanner 44 described later.

The reading mode is used set some reading conditions, such as the image cutout position, discrimination between single-sided and double-sided reading and discrimination between ON and OFF of the scanner 10. The reading data is supplied to the PC (or WS) 30. On receipt of the reading data, the PC (WS) 30 supplies a specified number to an imprinter 40 described later. It should be noted that an OCR (Optical Character Reader) for reading characters may be used instead of the bar-code reader 36 for reading a bar code.

The document paper 34 then passes through a patch reader 38 (FIG. 3). The patch reader 38 detects mark changing information for changing a mark such as a blip mark to be attached when photographing an image of the document 34 on a microfilm. For example, the patch reader 38 sorts data contained in respective documents into the classification levels such as high, intermediate or low level by a certain criteria, according to the partition plate or sheet inserted between document papers. The patch reader 38 may detect data for automatically switching the scanner 10. The data detected by the patch reader 38 are transferred as document or page attribute information to the external PC (WS) 30 via a data transfer interface.

The paper 34 is then numbered by the imprinter (IMP) 40. For example, a document number is attached to the document paper 34, such as the specified number, which was supplied from the PC (WS) 30 in response to the output of the bar-code reader 36, or an ordinal number of the paper 34 which was set in the control unit 24. The OCR 42 reads data containing the document number attached to the paper 34 and supplies the read data to the PC (WS) 30. The read data is either stored in a memory as document or page attribute information together with image data to be read by the image scanner 44 described later, or transferred to the external PC (WS) 30 via an interface.

Represented by reference numbers 44, 44 are image scanners (CCD) each including a CCD arrayed line sensor. The line sensors are arranged perpendicularly to a moving direction of images printed on the forth and back faces of the document papers 34 traveling at a constant speed, so that the line sensors read the images of the papers 34 continuously while the papers 34 travel therebetween, i.e., while the papers 34 moves in a sub-scanning or vertical scanning direction. That is, the line sensors read the images of the papers 34 by a slit exposure system.

The CCD 44 cuts out an image in a partial area of a paper 34 in accordance with instructions from the control unit 24 or instructions previously input from the PC (WS) 30 to the CCD line sensor 44. The cutout image is transferred to the PC (WS) 30 via an interface together with image attribute information. The CCD 44 also selects a reading mode automatically based on a format number of the paper 34 read by the bar-code reader 36, and determines the image cutout position, single-sided reading or double-sided reading, and ON or OFF state of each CCD 44. Thus, image reading is performed as a result of such determination. Alternatively, the CCD 44 may obtain reading conditions, such as the image cutout position, which is specified by the PC (WS) 30 based on the format number of the paper 34 detected by the bar-code reader 36, and transfer the image data to the PC (WS) 30 together with associated attribute information.

When using such a device structure in a scanner, as shown in the upper part (A) of FIG. 2, the turn unit 16 is connected to the back side of the scanner 10. The turn unit 16 forces document papers 34 to make a U-turn upward and to continuously feed them through the upper portion of the scanner 10 in a reverse direction. The document papers 34 reversely fed are stacked on the stacker 18 provided in the upper front portion of the scanner 10. The stacker 18 has a pass stacker section 46 (FIG. 1) for turning over the papers normally read and stacking them in the same order as numbered to the papers, and a reject stacker section 48 (FIG. 1) for stacking papers to be reread due to error operation separately from the papers normally read. Also, the reject stacker section 48 may be used for dividing previously processed papers into two groups, where one group of papers is sorted and stacked up on the reject stacker section 48.

The turn unit 16 and the scanner 10 are connected with each other through a separable joint (not shown), so that driving force of feed rollers provided inside the scanner 10 can be transmitted to the turn unit 16. As shown in the part (A) of FIG. 2, when connecting the turn unit 16 with the scanner 10, the turn unit 16 can feeds papers at the same speed as the scanner 10 feeds. Further, a straight stacker section 50 is used for ejecting unacceptable papers which are too thick to pass through the turn unit 16.

The multi-sorter 22 may be used instead of the turn unit 16. The multi-sorter 22 sorts and stacks papers 34 previously processed and ejected from the scanner 10, while it collects and stacks thick papers on a straight stacker section 50A.

As shown in the part (A) of FIG. 2, such a structure is used in the scanner type document reader system. When adding a microfilm photographing function to the system, the microfilm camera 14 is provided between the scanner 10 and the turn unit 16. The lower part (B) of FIG. 2 shows a structure of a combined document reader and microfilm camera system. The microfilm camera 14 has a cabinet 20 with the top plane formed into an L type shape as mentioned above, and an optical system is provided inside the cabinet 20 for transmitting images printed on the forth and back faces of a paper 34 to be recorded on a microfilm.

Figure 5:
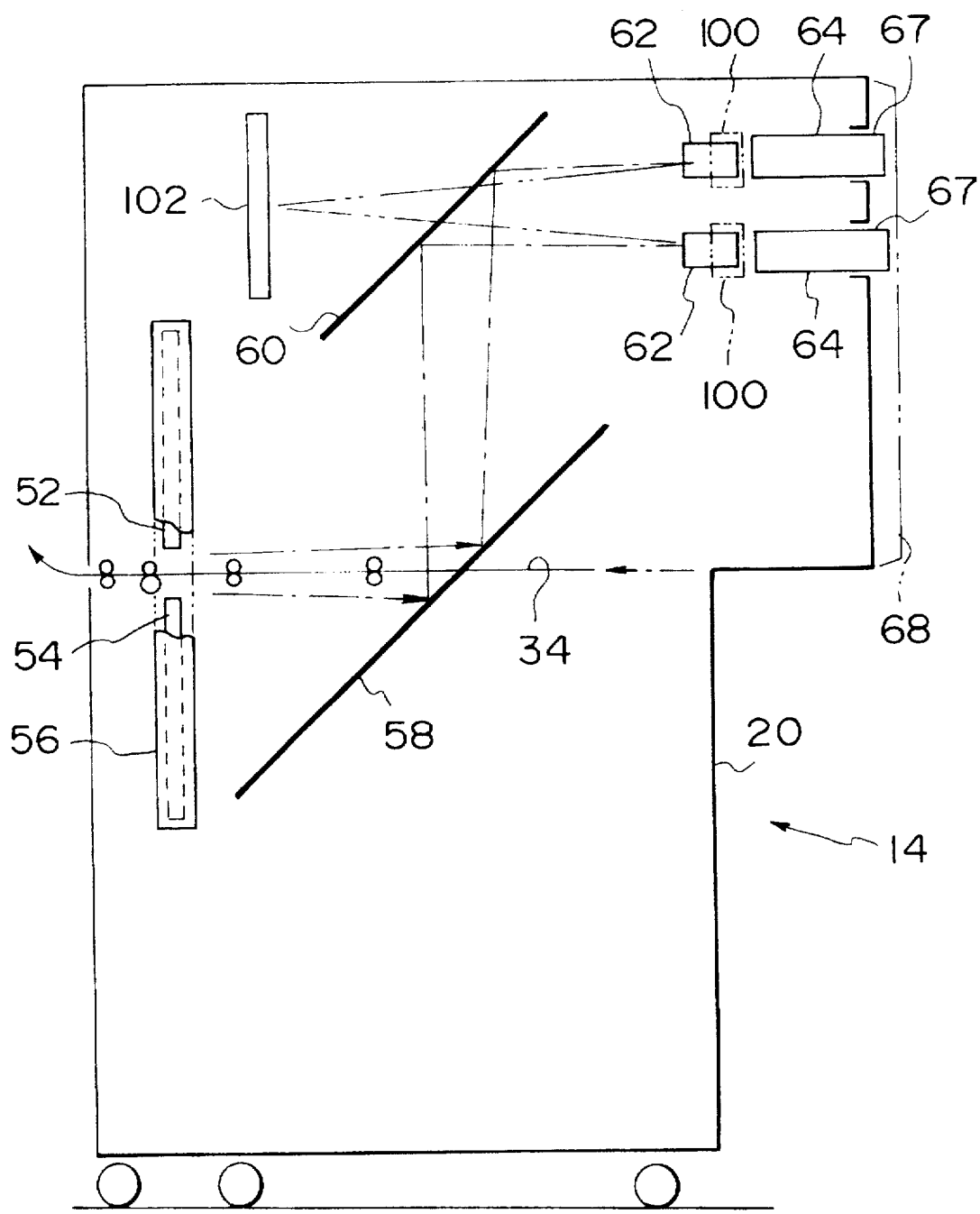
FIG. 5 is a side view showing an optical system of the microfilm camera in FIG. 1, as seen from the side represented by the arrow V in FIG. 4.
Figure 6:
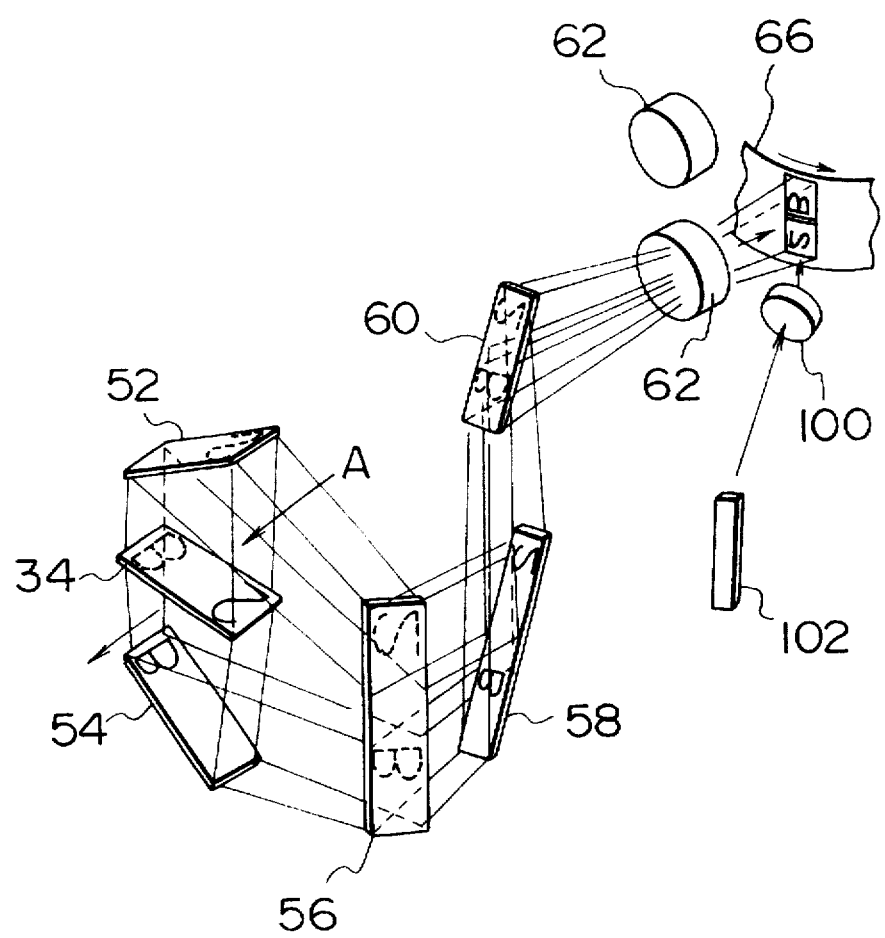
FIG. 6 is a perspective view of the optical system of the microfilm camera shown in FIG. 5.

As shown in FIGS. 4 to 6, the optical system includes first and second mirrors 52, 54 opposite to each other obliquely with respect to the forth and back faces of the document paper 34 and extending in a direction perpendicular to the traveling direction of the paper 34 (the traveling direction being represented by the arrow A in FIG. 6); third, fourth and fifth mirrors 56, 58 and 60 for simultaneously reflecting images on the forth and back faces of the paper 34 which were reflected in both the mirrors 52, 54; and two photographic lenses or image taking lenses 62, 62. The optical system may be constituted such that an image on either the forth face or back face of the paper 34 is photographed on a microfilm.

The image taking lenses 62, 62 are opposite to microfilm cassettes 64, 64, respectively, so that images reflected through the mirrors in the optical system can be photographed on microfilms 66 (FIG. 6) by a slit exposure system, each microfilm 66 mounted inside the corresponding microfilm cassette 64 and traveling at a constant speed. As shown in FIG. 6, the images on the forth and back faces of the paper 34 are thus photographed on the microfilm 66 in parallel in the width side direction (duplex method).

The microfilm cassettes 64, 64 are loaded into cassette loading ports 67, 67 from the front of the cabinet 20, respectively. The cassette loading ports 67, 67 are open vertically at two stages and situated on the front panel of the cabinet 20, i.e., at the left side of the stacker 18 (see FIGS. 1, 4 and 5). The cassette loading ports 67, 67 are covered with a cover 68 on purpose to shut out light from the outside. Since the cassettes 64, 64 are positioned vertically at two stages so that images of the same paper can be photographed at the same time, simultaneous exposure can be performed to the two microfilms 66, 66, thereby improving efficiency of photographing process. It should be noted that a single cassette loading port 67 may be used for loading only one cassette 64 to expose only one microfilm 66 at a time.

As shown in FIG. 7, the cassette 64 has a rectangular case 70, and a supply reel 72, a take-up reel 74 and a photographic roller 76 are disposed in the length side direction of the case 70. A photographic opening 78 is provided on one wall side of the case 70 opposite to the photographic roller 76, and a shutter 80 is slidably provided along the inner face of the wall. The shutter 80 is equipped with a window (not shown) for opening and closing the photographic opening 78.

The shutter 80 is then guided by guide pins, with one end of the shutter 80 pulled by a coil spring 82 and the other end thereof attached to a pin 84 movable along an elongated guide hole 86. The pin 84 is moved along the elongated guide hole 86 by a slide member 88 provided inside the case 70. That is, the pin 84 is guided and moved along the elongated guide hole 86 and an elongated hole 90 provided in the slide member 88 while pulling and moving the shutter 80.

When loading the cassette 64 into the cassette loading port 67, the slide member 88 is engaged with a claw (not shown) projecting inwardly in the cassette loading port 67 and pushed on the right hand in FIG. 7. Subsequently, the pin 84 is moved to the right in the elongated hole 86 while pulling and moving the shutter 80, so that the window of the shutter 80 can coincide with the photographic opening 78. Thus, the photographic opening 78 is opened and the microfilm cassette 64 is made ready for taking a photograph.

The roll film 66 is pulled out from the supply reel 72, guided by three guide rollers 92, wrapped around the photographic roller 76, and wound up onto the take-up reel 74 through a guide roller 94. The roll film 66 tightly wrapped around the photographic roller 76 is pressed from the both sides by the nip rollers 96, 96 to secure adherence of the roll film 66 to the photographic roller 76.

Each nip roller 96 is held at a tip of a corresponding lever 98 extending in the length side direction of the case 70. The levers 98, 98 are forced by a torsion spring (not shown) to return to the side of the photographic roller 76.

Represented by reference numerals 100, 100 are mark taking lenses arranged close to the side of the image taking lenses 62, 62, respectively. Each mark taking lens 100 has an optical axis inclined or tilted in the length side direction of the roll film 66 or the film traveling direction with respect to the line perpendicular to the roll film 66 wrapped around the photographic roller 76. On the optical axes of the mark taking lenses 100, 100, digital image generators 102, 102 such as LED (light-emitting diode) arrays are arranged in the width side direction of the roll film 66 (where only one generator is shown in FIGS. 4 and 6). A single-type digital image generator 102 may be used instead of the above generators 102, 102 for projecting digital images such as blip marks on the two microfilms 66, 66 at the same time through the mark photographing lenses 100, 100, respectively.

The digital image generator 102 generates a one-dimensional image which varies in synchronous with the traveling speed of the film 66, and the generated image is photographed through the lens 100 on the film 66 currently traveling, thus taking a photograph of other data on the film 66 nearby a photographed image of a document paper or by superimposing it on the photographed image.

In the case 70 of the cassette 64, one short side 70A (see FIG. 7) opposite to the image taking lens 62 is bulged or distorted outwardly around the photographic opening 78 to show a symmetry with respect to the central axis of the photographic opening 78. When loading the cassette 64 into the cassette loading port 67, both corners of the short side 70A strike positioning members 67A, 67A, respectively, and the cassette 64 is positioned there. Since the short side 70A is distorted and expanded around the center of the photographic opening 78, the central portion of the short side 70A, i.e., the photographic opening 78 projects from a gap between the positioning members 67A, 67A and comes close to the image taking lens 62.

As a result, the optical axis of the mark taking lens 100 is less susceptible to interference produced by the edge of the photographic opening 78 of the case 70, so that the mark taking lens 100 to be arranged in the camera can be easily designed. Also, this makes it possible to reduce the size of the photographic opening 78, and hence the moving amount of the shutter 80 is reduced. Accordingly, the drive mechanism of the shutter 80 can be made compact, and a rational arrangement suitable for a compact cassette can be obtained.

Figure 9A:
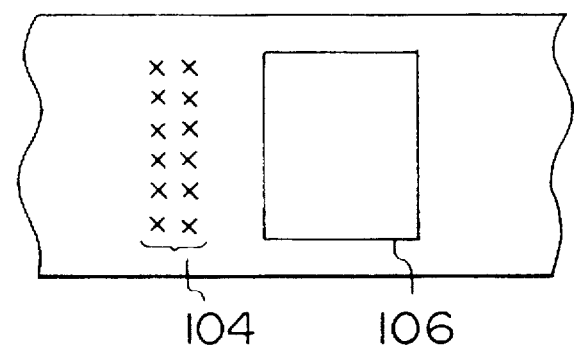
FIGS. 9A to 9C are descriptive diagrams showing examples of retrieval marks superimposed on the microfilm.
Figure 9B:
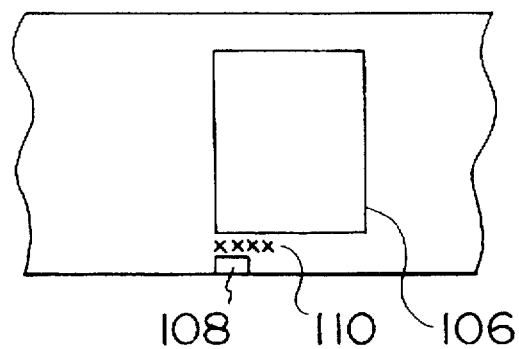
Figure 9C:
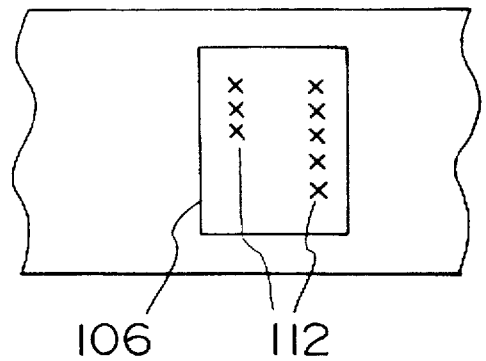

FIG. 9A shows a portion of a microfilm in which a title 104 of a document is inserted before or after an image in a frame 106 photographed on the microfilm. It will be understood that the title 104 may contain other document information such as category, date, location and operator's name. FIG. 9B shows a blip mark 108 and a retrieval number 110 recorded outside of the frame 106, whereas FIG. 9C shows characters 112 superimposed on the photographed image in the frame 106 or image data and the character 112 synthesized in the frame 106. The title 104, the mark 108, the number 110 and the characters 112 shown in FIGS. 9A to 9C may be recorded in combination.

Figure 8A:
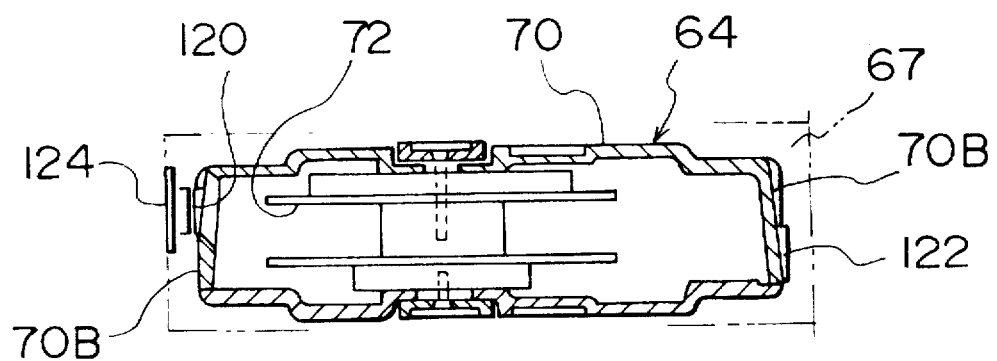
FIG. 8A is a cross sectional view taken along the line VIII—VIII in FIG. 7.
Figure 8B:
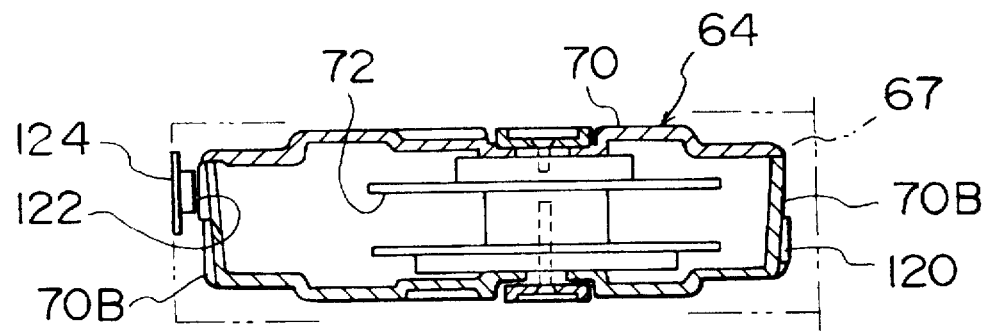
FIG. 8B is a cross sectional view taken along the line VIII—VIII in FIG. 7, showing a state in which the microfilm cassette was turned over.

A pair of labels 120, 122 containing data on photographic conditions are also attached to the cassette 64. The labels 120, 122 show a symmetry with respect to the central axis parallel to the length side of the cassette 64, i.e., the labels 120, 122 are located in positions symmetric with respect to the center line where the central cross-sections of the width side (short side) and the length side intersect with each other (FIG. 8). In the embodiment, the labels are attached to the length side walls 70B, 70B.

Figure 10:
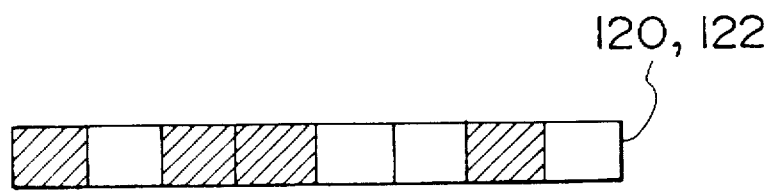
FIG. 10 is a diagram showing an example of a label to be attached to the microfilm cassette according to the embodiment of the present invention.

Each of the labels 120, 122 may be a code table printed on a tape as shown in FIG. 10. In this case, 8-digit binary data represent photographic conditions with black and white frames. For example, one-digit frame represents a cassette side currently loaded, 4-digit frames are used as a cassette ID number identifier, and 3-digit frames are used for identifying film thickness and film type. In such photographic conditions, the film thickness data is needed for focus control of the image taking lens 62, whereas the film type data contains film sensitivity needed to determine the exposure when taking a photograph.

On the other hand, one label detection means 124 is mounded inside the cassette loading port 67 of the camera in a position opposite to either of the labels 120, 122. The label detection means 124 may be constituted of eight light sources (e.g., eight light-emitting diodes) and eight light-receiving elements (e.g., eight photo-transistors).

However, the labels 120, 122 and the label detection means 124 are not limited to such an optical detection means as discussed above. For example, magnetism means may be used instead of the above labels and label detection means, in which the labels 120, 122 are recorded on a magnetic tape or with magnetic ink, and detected by a magnetic sensor. Also, the labels 120, 122 may be recorded on a combined conductive and non-conductive material, and detected by electric detection means for electrically detecting conductivity of each frame of the labels. Further, plural tabs may be used instead of the labels 120, 122. In this case, the tabs are arranged on the length side walls 70B, 70B of the case 70 and some portions are removed as required, so that the same function as the code table in FIG. 10 can be fulfilled.

Although the above embodiment showed a structure, in which the document papers 34 are fed horizontally from the front auto-feeder (ADF) 12 toward the inner part, and carried by the turn unit 16 to return to the upper portion of the front scanner 10, the document papers 34 may be carried laterally as seen from the front. In this case, the ADF, the scanner (with or without microfilm camera) and the turn unit must be arranged in the lateral direction in this order. If ADF 12, turn unit 16 and stacker 18 of several types are held in reserve, the variety of combinations will increase.

As described above, a microfilm cassette according to the present invention is constituted as follows: a case of the cassette is formed into a substantially rectangular shape; a supply reel and a take-up reel are mounted inside the case and arranged adjacent to each other in parallel in the length side direction of the case; a photographic opening is formed around the center of one short side of the case; and a photographic roller is arranged close to the photographic opening.

Figure 11:
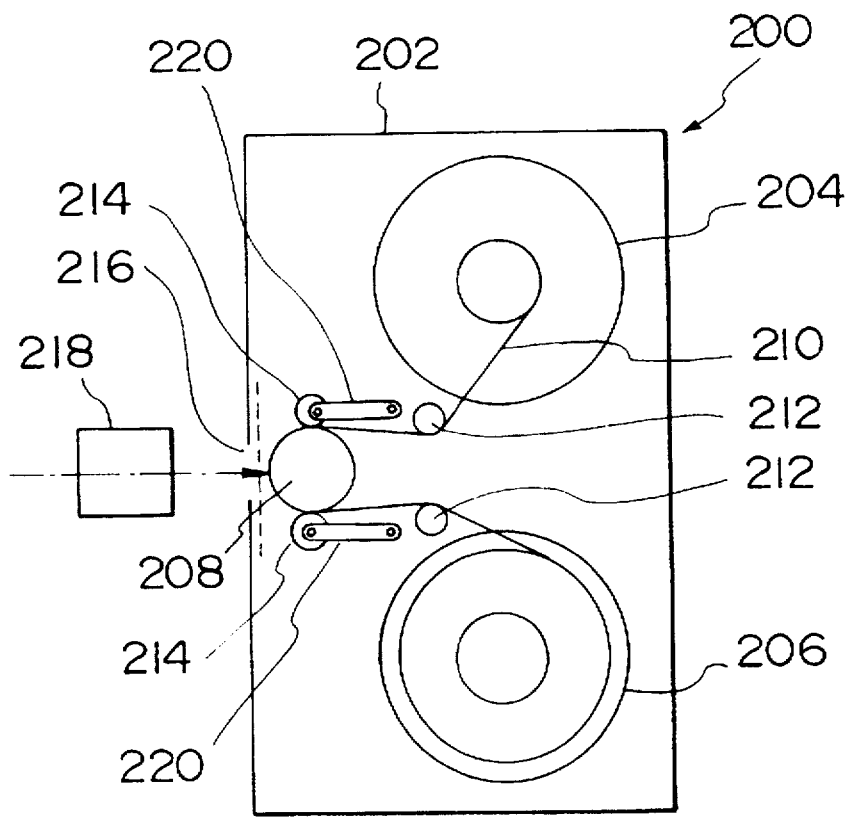
FIG. 11 is a plan view showing an inner arrangement of a conventional microfilm cassette.

In such a structure, an adequately large space is secured on both sides of the photographic roller so that levers for retaining a pair of nip rollers can be arranged along the length side direction of the case. Since the two reels can be positioned close to each other by making a gap therebetween small enough, even if the photographic roller is arranged in the length side direction of the case and at the back or forth side of the reels, the length of the whole case, i.e., the size of the long side of the case dose not increase so much compared with the conventional cassette structure in FIG. 11. Meanwhile, the short side of the case can be determined substantially based on the diameter of the reel, so that the size (of the short side) can be adequately reduced, thereby obtaining a compact cassette.

If one short side of the case opposite to the photographic roller is distorted and expanded outwardly around the center of the photographic opening, the mark taking lens can be easily arranged when taking a photograph of a mark through the photographic opening. This is convenient to avoid interference between the mark taking lens and the case. Since the short side of the case is expanded outwardly around the photographic opening, the optical axis of the mark taking lens could not interfere with the photographic opening, so that size of the photographic opening can be reduced, thereby obtaining a compact drive mechanism of the shutter.

If a pair of labels are attached to the cassette in positions symmetric with respect to the central axis parallel to the length side of the case, the labels containing data for identifying photographic conditions of the cassette, the photographic conditions can be obtained securely with a simplified cassette structure. For example, if the currently loaded cassette side is identified without fail, a duo-photographing method can be used without fear of making a mistake in film feed direction.

A microfilm camera according to the present invention can use the cassette with labels attached thereto for detecting photographic conditions such as a cassette side currently loaded. Also, the microfilm camera according to the present invention can use the cassette with one short side of the case distorted outwardly around the center of the photographic opening opposite to the photographic roller for superimpose a mark on a microfilm through the mark taking lens situated close to by the image taking lens at the same time when taking a photograph of an image.

What is claimed is:

1. A microfilm cassette with a roll film mounted therein for photographing images of document papers on the roll film by a slit exposure system, comprising:

a case having a substantially rectangular shape as viewed from the top;

a supply reel and a take-up reel mounted inside said case and arranged adjacent to each other horizontally in the length side direction of said case, where the roll film is wound round the reels from both ends of the roll film;

a photographic opening formed around the center of one short side wall of said case;

a photographic roller for being wrapped with the roll film around the outer surface thereof, the photographic roller being arranged in a position opposite to said photographic opening; and a shutter for opening and closing said photographic opening.

2. The microfilm cassette according to claim 1, wherein the one short side wall of said case on which said photographic opening is provided is bulged and expanded outwardly around the center of said photographic opening.

3. The microfilm cassette according to claim 1, wherein a pair of labels are provided in positions substantially axial-symmetric with respect to the central axis parallel to the long side of said case.

4. The microfilm cassette according to claim 2, wherein a pair of labels are provided in positions substantially axial-symmetric with respect to the central axis parallel to the long side of said case.

5. A microfilm camera using a microfilm cassette, comprising:

at least one cassette loading port for loading said microfilm cassette from said photographic opening side, said microfilm cassette comprising a case having a substantially rectangular shape as viewed from the top, a supply reel and a take-up reel mounted inside said case and arranged adjacent to each other horizontally in the length side direction of said case, where a roll film is wound round the reels from both ends of the roll film, a photographic opening formed around the center of one short side of said case, a photographic roller being wrapped with said roll film around the outer surface thereof, the photographic roller being arranged in a position opposite to said photographic opening, a shutter for opening and closing said photographic opening, and a pair of labels provided in positions substantially axial-symmetric with respect to the central axis parallel to the long side of said case; and a label detection means provided on the inner surface of said cassette loading port for detecting one of the labels, whereby photographic conditions can be read from the contents of the label detected by said label detection means.

6. A microfilm camera using a microfilm cassette, comprising:

at least one cassette loading port for loading said microfilm cassette from said photographic opening side, said microfilm cassette comprising a case having a substantially rectangular shape as viewed from the top, a supply reel and a take-up reel mounted inside said case and arranged adjacent to each other horizontally in the length side direction of said case, where a roll film is wound round the reels from both ends of the roll film, a photographic opening formed around the center of one short side of said case, a photographic roller being wrapped with said roll film around the outer surface thereof, the photographic roller being arranged in a position opposite to said photographic opening and a shutter for opening and closing said photographic opening;

an image taking lens for photographing images of document papers on the roll film contained in said microfilm cassette through said photographic opening; and a mark taking lens for recording or superimposing other data such as a mark on the roll film through said photographic opening, the mark taking lens being arranged in positions opposite to said photographic opening such that optical axes of the both lenses are separate from each other in the film traveling direction and intersect with each other at a point near the film surface.

* * * * *